(12) United States Patent
Maier et al.

(10) Patent No.: US 9,600,012 B2
(45) Date of Patent: Mar. 21, 2017

(54) INTERNAL POWER SUPPLY OF A DEVICE

(71) Applicant: Siemens Aktiengesellschaft, Munich (DE)

(72) Inventors: Martin Maier, Erbendorf (DE); Uwe Weiss, Amberg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 14/904,767

(22) PCT Filed: Jul. 26, 2013

(86) PCT No.: PCT/EP2013/065796
§ 371 (c)(1),
(2) Date: Jan. 13, 2016

(87) PCT Pub. No.: WO2015/010746
PCT Pub. Date: Jan. 29, 2015

(65) Prior Publication Data
US 2016/0170431 A1 Jun. 16, 2016

(51) Int. Cl.
*G05F 3/00* (2006.01)
*G05F 3/04* (2006.01)
(Continued)

(52) U.S. Cl.
CPC ............... *G05F 3/04* (2013.01); *H02H 1/063* (2013.01); *H02H 3/083* (2013.01); *H02M 7/217* (2013.01); *H02M 2001/0006* (2013.01)

(58) Field of Classification Search
CPC . H02M 7/217; H02M 2001/0006; G05F 3/04; H02H 3/083; H02H 1/063
(Continued)

(56) References Cited

U.S. PATENT DOCUMENTS 6,624,997 B1 * 9/2003 Llanos et al. ......... H01F 27/343
307/105
7,187,566 B2 * 3/2007 Kawashima et al. . H02M 1/126
363/125
(Continued)

FOREIGN PATENT DOCUMENTS

EP 2 040 084 A1 3/2009
WO WO 2006/031792 A2 3/2006

*Primary Examiner* — Adolf Berhane
*Assistant Examiner* — Afework Demisse
(74) *Attorney, Agent, or Firm* — Cozen O'Connor

(57) ABSTRACT

A device connectable to a three-phase network, wherein the device includes a capacitor, a secondary coil, a diode and, per phase, a conductor and a circuit, where a secondary-side coil is connected in parallel to the capacitor via the diode, the circuit is configured such that a resistor is located in a conductor, a first capacitor is connected parallel to the resistor, a serial circuit of a first primary-side coil is connected in parallel to the first capacitor, energy transfer occurs from a first primary-side coil to a second primary-side coil and to the secondary-side coil, a second capacitor is connected in parallel to the second primary-side coil, the second capacitor is connected to the source connection of a self-conducting field effect transistor, and the gate connection of the self-conducting field effect transistor is connected to the second capacitor to provide an improved internal power supply for the device.

9 Claims, 1 Drawing Sheet

(51) Int. Cl.
*H02M 7/217* (2006.01)
*H02H 1/06* (2006.01)
*H02H 3/08* (2006.01)
*H02M 1/00* (2006.01)

(58) Field of Classification Search
USPC .......................................................... 323/304
See application file for complete search history.

(56) References Cited

U.S. PATENT DOCUMENTS

| | | |
|---|---|---|
| 2005/0017602 A1 | 1/2005 | Arms et al. |
| 2006/0077607 A1 | 4/2006 | Henricks et al. |
| 2006/0077608 A1 | 4/2006 | Speno et al. |
| 2009/0079417 A1 | 3/2009 | Mort et al. |
| 2014/0321177 A1* | 10/2014 | Turki .................... H02M 7/06 |
| | | 363/126 |

* cited by examiner

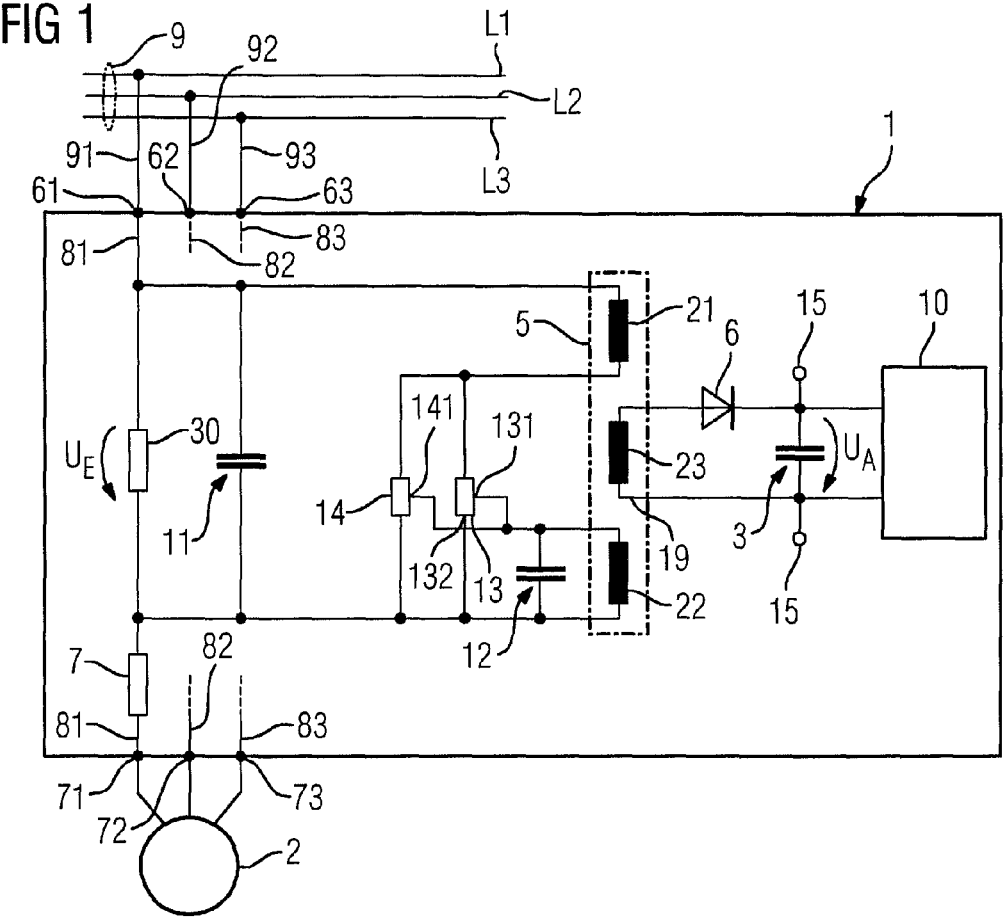
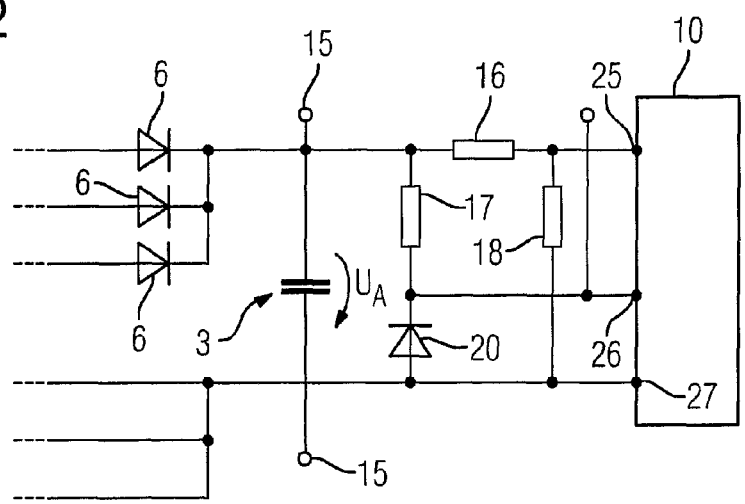

INTERNAL POWER SUPPLY OF A DEVICE

CROSS-REFERENCE TO RELATED APPLICATIONS

This is a U.S. national stage of application No. PCT/EP2013/065796 filed 26 Jul. 2013.

BACKGROUND OF THE INVENTION

1. Field of the Invention

The invention relates to a device which is connectable to a three-phase supply network, where the device particularly serves to protect the motor or the conductor. Here, power is supplied to a load downstream of the device, e.g., an electric motor, by the device. If a three-phase system is present, for instance, the flow of power occurring across three phases L1, L2, L3 of a supply network to a downstream load can be monitored with the device. In order to analyze the flow of power occurring across the three phases, the device comprises an electronic evaluation unit. Upon the occurrence of a critical state, the device interrupts the flow of power to the downstream load. Devices of this type, such as a circuit breaker, are particularly used in the field of industrial automation technology. A power supply to the internal electronics (e.g., electronic evaluation unit) is required in devices of this type.

1.2. Description of the Related Art

An internal power supply can occur, for instance, via a current converter. The current converter converts an AC current in the primary conductor of a device into a secondary current, which can be used to supply power and to detect current. A current-driven 1-phase power supply is thus possible. However, this principle is disadvantageous with respect to DC operation, lacks a compact design and does not have a low level of cost.

Alternatively, power can be supplied internally via an auxiliary voltage. Here, the required voltage is fed externally via terminals, for instance, is adjusted by an upstream power supply and then supplied to an electronic evaluation units. An AC and DC operation with a compact structure is thus possible. However, this principle is disadvantageous with respect to current detection and does not have low level of cost. Different power supply embodiments are also necessary because the varied voltages in the different systems. Moreover, an additional expense occurs with one user because he requires additional power supply lines and must connect to the device.

In the field of Energy harvesting, single-phase power supplies with step-up converters, which are used to supply power internally, are likewise known. Step-up converters can convert the smallest voltages into usable electronic voltages of a few volts. The disadvantage of these power supplies is in particular the absent, completely galvanic separation between the primary and second side within the device.

SUMMARY OF THE INVENTION

In view of the foregoing, it is an object of the invention to provide an improved internal power supply for a device which is connectable to a three-phase supply network. In particular, the device is to provide a current-driven power supply. Here, a galvanic separation between the primary and secondary side of the device, i.e., between the phases L1, L2, L3 and the electronic evaluation units, preferably exists. The device preferably also enables an overcurrent tripping. The internal power supply of the device can preferably occurs both in AC operation (e.g., single phase network and three-phase network) and also in DC operation (e.g., direct current network). The internal power supply can preferably be implemented via a compact structure and/or via a low cost level.

These and other objects and advantages are achieved in accordance with the invention by providing a device which is connectable to a three-phase power supply, where the device comprises a third capacitor, by way of which an internal power supply of the device occurs, a secondary-side coil, a diode and for each phase a conductor and circuit for the power supply, where the secondary-side coil is connected in parallel to the third capacitor via the diode, where the circuit comprises a measuring resistor, a first and second capacitor, a self-conducting field effect transistor and a first and second primary-side coil, and where the circuit is configured such that the measuring resistor is disposed in the conductor, such that an input voltage $U_E$ drops across the measuring resistor; the first capacitor is connected in parallel with the measuring resistor; a series circuit of the first primary-side coil with the self-conducting field effect transistor is connected in parallel with the first capacitor; power is transferred from the first primary-side coil to the second primary-side coil and to the secondary-side coil in the energize state of the conductor; the second capacitor is connected in parallel with the second primary-side coil; the second capacitor is connected on the output side to the source connection of the self-conducting field effect transistor; and the gate connection of the self-conducting field effect transistor is connected on the input-side to the second capacitor such that in the energized state of the conductor, the self-conducting field effect transistor is controlled in a clocked manner.

The device serves in particular to protect a motor and/or the conductor. Three phases (L1, L2, L3) of a supply network can be supplied by the device. In order to connect these three phases, the device preferably comprises for each phase one input-side and one output-side connecting arrangement. The respective input-side connecting arrangement is herewith internally connected to the associated output-side connecting arrangement via the conductor. The device thus has a conductor per phase (L1, L2, L3) to be connected. The three conductors each have a circuit. The circuit has a measuring resistor, which is disposed in the associated conductor. In the energized state of the conductor, the conductor current flows across the measuring resistor. An input voltage $U_E$ drops across the measuring resistor disposed in the conductor as a function of the existing conductor current.

The device has a primary side, by which power is supplied to a secondary side of the device. The primary side is electrically conductively connected to the conductor. The secondary side is electrically conductively connected to the secondary-side coil. The transfer of power from the primary side to the secondary side occurs via the first primary-side coil, which is coupled to the secondary-side coil via at least a coil core so that, in this way, power can in this way be transferred from the first primary-side coil to the secondary-side coil. Moreover, the first primary-side coil, with the at least one coil core, is coupled to the second primary-side coil so that power can be transferred from the first primary-side coil to the second primary-side coil.

A shared coil core can be used in the device to transfer power from the primary side to the secondary side for a number of conductors. The first and second primary-side coils and the secondary-side coil would be wound here around the shared coil core. At the secondary-side, only the secondary-side coil is coupled to the coil core. This secondary-side coil is connected to the third capacitor via the diode and can charge the third capacitor.

It is likewise conceivable for the first and second primary-side coils of the individual circuits to each have a separate coil core. A coil core thus exists per conductor and per circuit. The first primary-side coil, the second primary-side coil and the secondary-side coil are wound around the respective coil core. Per conductor, the device would thus have a first and second primary-side coil and a secondary-side coil, which are wound around a shared coil core. The secondary-side coils are each connected to the third capacitor by a separate diode, such that the third capacitor is fed with power by the secondary-side coils.

Power is transferred from the primary side to the secondary side from the first primary-side coil via the coil core to the secondary-side coil. The secondary side is galvanically separated from the primary side. Moreover, the conductors and the primary-side part of the circuits are galvanically separated from one another.

In the presence of a conductor current, power is transferred into the second primary-side coil by the first primary-side coil. The second capacitor is charged via the current induced into the second coil. Moreover, a clocked control of the self-conducting field effect transistor across its gate connection occurs via the second primary-side coil. The circuit is made to oscillate by the clocked control of the self-conducting field effect transistor, such that the capacitor is charged on the secondary side.

This circuit of the disclosed embodiment means that in the energized state of the conductor an output voltage $U_A$ dropping across the second capacitor is greater than the input voltage $U_E$.

The internal power supply is provided via the third capacitor. An electronic evaluation unit of the device is in particular supplied with power via the third capacitor. The electronic evaluation unit particularly serves to detect an overcurrent and/or detect the overload of motors and/or conductors.

The third capacitor further serves to smooth the power provided by the secondary-side coil and to buffer the internal power supply.

In an advantageous embodiment of the invention, the circuit comprises a self-blocking field effect transistor, which is connected in parallel with the self-conducting field effect transistor, where the gate connection of the self-blocking field effect transistor is connected on the input side to the second capacitor such that the self-blocking field effect transistor is controlled in a clocked manner in the energized state of the conductor. As a result of the self-blocking field effect transistor being connected in parallel to the self-conducting field effect transistor, an increase in the degree of efficiency of the power supply is possible. The respective field effect transistor can likewise comprise a MOSFET.

The diode and the secondary-side coil, as well as the third capacitor, are galvanically separated from the primary side of the device, which comprises the self-conducting and self-blocking field effect transistor, the first and second capacitor, the first and second primary-side coil and the measuring resistor.

In a further advantageous embodiment of the invention, the device comprises per conductors one secondary-side coil and one diode, where the third capacitor is connected on the input side in each case to the diode and on the output side in each case to the coil connection of the secondary-side coil that does not lead to the diode.

With the three-phase system, the device comprises three conductors, which each have a circuit. Power is transferred from the primary side to the secondary side to the associated secondary-side coil via the first primary side coil. The three secondary-side coils are each connected to the third capacitor by a diode. The third capacitor is thus connected to in each case one diode of the three secondary-side coils and thus to three diodes on the input side. The third capacitor is in particular connected on the input side in each case to the cathode of the diode of the respective circuit.

In a further advantageous embodiment of the invention, the first, second, primary-side coil and the secondary-side coil are each formed by a printed circuit board (PCB) coil.

In a further advantageous embodiment of the invention, the inductance of the first primary-side coil is less than the inductance of the second primary side coil. The inductance of the first primary-side coil preferably lies approximately between 1 µH to 10 µH.

In a further advantageous embodiment of the invention, the inductance of the first primary-side coil is less than the inductance of the secondary-side coil. The inductance of the second primary-side coil preferably lies approximately between 5 mH to 50 mH.

In a further advantageous embodiment of the invention, the inductance of the second primary-side coil is similar to the inductance of the secondary-side coil. The inductance of the secondary-side coil preferably lies approximately between 5 mH to 50 mH.

In a further advantageous embodiment of the invention, the capacitance of the first capacitor is greater than the capacitance of the second capacitor. The capacitance of the first capacitor preferably lies approximately between 1 µF to 100 µF.

In a further advantageous embodiment of the invention, the capacitance of the first capacitor is similar to the capacitance of the third capacitor. The capacitance of the third capacitor preferably lies approximately between 1 µF to 220 µF.

In a further advantageous embodiment of the invention, the capacitance of the second capacitor is less than the capacitance of the third capacitor. The capacitance of the second capacitor preferably lies approximately between 10 µF to 10 µF.

In a further advantageous embodiment of the invention, the measuring resistor is a shunt. The resistance of the measuring resistor preferably lies approximately between 10 mΩ and 100 mΩ.

In a further advantageous embodiment of the invention, an overcurrent tripping for a downstream load takes occurs by evaluating the output voltage $U_A$ existing across the third capacitor.

For this purpose, the device particularly comprises a current detection unit. The power supply of the power detection unit preferably occurs via the third capacitor. The existing current intensity can be inferred by the current detection unit firstly by the existing output voltage $U_A$. If a threshold value stored in the current detection unit is exceeded, then the current detection unit detects an overcurrent and interrupts the flow of power occurring across the conductor to the load downstream of the device. The stored threshold value characterizes, for instance, the 10-fold nominal current of the conductor. The current detection unit is in particular a microcontroller. The current detection unit is in particular an integral part of the electronic evaluation unit.

In a further advantageous embodiment of the invention, a switching element is disposed in each—conductor, by which the flow of power across the conductor can be interrupted. The switching element is in particular an electromechanical switching element. Three phases of a supply network can in particular be fed to a load by the device, such that the device comprises three conductors. Each of these conductors thus has a switching element for interrupting the flow of power to the downstream load. If an overcurrent is detected by the device, the flow of power to the downstream load is preferably interrupted by the switching element.

In particular, power is supplied to an electric motor by the device. The device is in particular a device for the industrial automation technology, in particular a circuit breaker.

In a further advantageous embodiment of the invention, the internal power supply of the device occurs entirely via the output voltage $U_A$ dropping at the third capacitor. Here, the third capacitor comprises in particular two connecting points.

In a further advantageous embodiment of the invention, the circuits have a shared coil core. The first and second primary-side coils and the secondary-side coil of the circuits are thus wound around a shared coil core. The coil core is a ferrite core for instance.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention and embodiments of the invention are described and explained in more detail below with reference to the exemplary embodiments illustrated in the figures, in which:

FIG. 1 shows a schematic representation of a device which is connectable to a three-phase supply network; and FIG. 2 shows a schematic structure of the secondary side of the device of FIG. 1.

DETAILED DESCRIPTION OF THE EXEMPLARY EMBODIMENTS

FIG. 1 shows a schematic representation of a device 1 which is connectable to a three-phase supply network 9. The supply network 9 has three phases L1, L2, L3. The power supply of an electric motor 2 downstream of the device 1 occurs via the device 1. The device 1 is a circuit breaker, by means of which protection of the electric motor 2 from overcurrent is ensured.

For each phase of the supply network 9, the device 1 has an input-side and an output-side connecting arrangement 61, 62, 63, 71, 72, 73. To supply power to the load 2, the first input arrangement 61 is connected to the first phase L1 of the supply network 9 and the first output-side connecting arrangement 71 is connected to the electric motor 2. The first phase L1 is guided internally from the first input-side connecting arrangement 61 via a first conductor 81 to the first output-side connecting arrangement 71. The second input arrangement 62 is connected to the second phase L2 of the supply network 9 and the second output-side connecting arrangement 72 is connected to the electric motor 2. The second phase L2 is guided internally from the second input-side connecting arrangement 62 via a second conductor 82 to the second output-side connecting arrangement 72. The third input arrangement 63 is connected to the third phase L3 of the supply network 9 and the third output-side connecting arrangement 73 is connected to the electric motor 2. The third phase L3 is guided internally from the third input-side connecting arrangement 63 via a third conductor 83 to the third output-side connecting arrangement 73.

The device 1 comprises a third capacitor 3 and for each conductor 81, 82, 83 a secondary-side coil 23, a diode 6, a coil core 5, a switching element 7 and a circuit for charging the third capacitor 3. An internal power supply of the device 1 occurs via the third capacitor 3.

For the sake of clarity, only the circuit, the secondary-side coil 23, the diode 6 and the switching element 7 are illustrated for the first conductor 81. The second and third conductor 82, 83 each have an analog structure.

The device has a primary side and a secondary side for each conductor 81, 82, 83. The primary side comprises a measuring resistor 30, which is a shunt, a first capacitor 11, a second capacitor 12, a self-conducting field effect transistor 13, a self-blocking field effect transistor 14, a first primary-side coil 21 and a second primary-side coil 22. Part of the primary side of the device 1 is thus formed by the circuit. The secondary side comprises the diode 6 and the secondary-side coil 23. The secondary-side coil 23 is connected in parallel to the third capacitor 3 by the diode 6.

For each conductor, the primary-side part of the device is galvanically separated from the secondary-side part of the device. The power is transferred from the primary-side part to the secondary-side part by the first primary-side coil 21, which is coupled to the secondary-side coil by the coil core 5.

The circuit of the first conductor 81 is configured such that the measuring resistor 30 is disposed in the conductor 81; the first capacitor 11 is connected in parallel with the measuring resistor 30; a series circuit of the first primary-side coil 21 with the self-conducting field effect transistor 13 is connected in parallel with the first capacitor 11; the first primary-side coil 21, the second primary-side coil 22 and the secondary-side coil 23 are wound around the coil core 5; the second capacitor 12 is connected in parallel with the second primary-side coil 22; the second capacitor 12 is connected on the output side to the source connection 132 of the self-conducting field effect transistor 13; the gate connection 131 of the self-conducting field effect transistor 13 is connected on the input side to the second capacitor 12; the self-blocking field effect transistor 14 is connected in parallel with the self-conducting field effect transistor 13; and the gate connection 141 of the self-blocking field effect transistor 14 is connected on the input side to the second capacitor 12.

An input voltage $U_E$ drops across the measuring resistor 30 disposed in the conductor 81 as a function of the existing phase current. In the energized state of the conductor 81, a magnetic flux is generated in the coil core 5 by the first primary-side coil 21. However, a voltage is induced on the second primary-side coil 22 and the secondary-side coil 23.

A clocked control of the self-conducting field effect transistor 13 and the self-blocking field effect transistor 14 occurs via the second primary-side coil 22.

The clocked control of the self-conducting field effect transistor 13 causes the circuit to oscillate. As a result of the self-blocking field effect transistor 14 being connected in parallel with the self-conducting field effect transistor 13, the degree of efficiency of the power supply to the secondary side is increased. Power is transferred from the primary side to the secondary side of the device 1 across the coil core 5 to the secondary-side coil 23 by the first primary-side coil 21.

The first and second primary-side coil 21, 22 are galvanically separated from the secondary-side coil 23.

The device 1 has a secondary-side coil 23 for each conductor 81, 82, 83. The three secondary-side coils 23 of the individual conductors 81, 82, 83 are each connected to the third capacitor 3 by its diode 6. The third capacitor 3 is connected on the input side in each case to the diode 6 and, on the output side, in each case to the coil connection 19 of the respective secondary-side coil 23 that does not lead to the diode 6. The third capacitor 3 is thus fed with power by the three secondary-side coils 23.

The circuit in accordance with disclosed embodiments means that, in the energized state of at least one of the conductors 81, 82, 83, an output voltage $U_A$ that drops across the third capacitor 3 is greater than the input voltage $U_E$.

The third capacitor 3 has two connecting points 15 for the internal power supply. An internal electronic evaluation unit can be supplied with power here.

The third capacitor 3 is grounded to the internal evaluation unit.

A galvanically separated internal power supply of the device 1 can be provided by the third capacitor 3 by the three circuits of the three conductors 81, 82, 83.

The circuit is entirely galvanically separated from the secondary-side of the device 1.

The three secondary-side coils 23 are coupled to one another by half-wave rectifiers (the diodes 6) and together feed the third capacitor 3. A secondary-side buffering of the fed power also occurs via the third capacitor 3.

Since the voltage generated across the third capacitor 3 on the secondary side ($U_A$) is proportional to the up to three primary voltages $U_E$ (voltages on the measuring resistor 30) and thus proportional to the three primary currents in the phases L1, L2, L3. As a result, the evaluation of this voltage can be used to detect current (e.g., overcurrent evaluation) in the three phases L1, L2, L3.

A current detection unit 10 of the device 1 is connected in parallel here with the third capacitor 3. The existing current intensity of the conductors 81, 82, 83 is inferred via this current detection unit 10 via the existing output voltage $U_A$. If a threshold value stored in the current detection unit 10, which characterizes the 10-fold nominal current of the conductor, is exceeded, the current detection unit 10 thus identifies an overcurrent and interrupts the flow of power occurring across the conductors 81, 82, 83 to the downstream load 2 via the electromechanical switching element 8 of the conductors 81, 82, 83.

When power is transferred from the primary side to the secondary side, instead of wound coil elements, the coil windings of the first and second primary-side coil 21, 22 and the secondary-side coil 23 are integrated as PCB coils in a single or multi-layer PCB. The three PCB coils per conductor 81, 82, 83 are each surrounded by the coil core 5 (e.g., ferrite core).

In this exemplary embodiment, power is transferred from the primary side to the secondary side per phase L1, L2, L3 via a separate coil core 5. For each conductor 81, 82, 83, the three coil windings (first and second primary-side coil 21, 22, secondary side coil 23) are wound around a coil core 5. With respect to the internal power supply, three first and second primary-side coils 21, 22, three coil cores 5, three secondary-side coils 23 and three diodes 6 are thus present inside the device. The three secondary-side coils 23 are each connected within the device by their respective diode 6 (triple half-wave rectifier) to the third capacitor 3, so that they can each charge the third capacitor 3.

It is likewise conceivable for the first and second primary-side coils 21, 22 and secondary-side coil 23 of the conductors together to have a shared coil core 5. Here, a secondary-side coil 5 and a diode 6 would only be required on the secondary side. The secondary-side coil 5 would be connected to the third capacitor 3 by the diode 6, such that these components can charge the third capacitor 3. Only three first and second primary-side coils 21, 22 (for the three conductors 81, 82, 83) and one secondary-side coil 23 would thus be wound around the coil core 5.

In order to start to move/oscillate the described circuit, the self-conducting field effect transistor 13 in the electric torque of the primary voltage is conducting and provides for the first flow of power in the transmitter (power transfer from the first primary-side coil to the secondary-side coil). To increase the degree of efficiency, the self-blocking field effect transistor 14 is connected in parallel with the self-conducting field effect transistor 13. The comparatively significantly lower-impedance forward DC resistance (compared with the self-conducting field effect transistor 13) takes effect above the switch-on threshold of the self-blocking field effect transistor 14 and provides for an improved further flow of power in the transmitter.

A 1-phase, 2-phase or 3-phase AC or DC current in the three phases L1, L2, L3 (e.g. motor current) generates a sufficiently high electronic voltage irrespective of the phase-to-phase voltage on the secondary side of the device 1, such that a current-driven power supply of the device 1 is present. A 1-phase, 2-phase or 3-phase operation of the device is thus possible.

A current-driven power supply in the AC and DC operation is possible via the novel structure of the power supply for motor or conductor protection.

An internal power supply is enabled by the device despite the entirely galvanic separation between the primary side (phases L1, L2, L3) and the secondary side (electronic evaluation circuit).

No second transmitter for each phase is required for the galvanic separation of the fed-back startup/clock circuit, because this circuit element is integrated in the same transmitter as the respective step-up converter. As a result, a cost savings is attained.

Embodying the coils 21, 22, 23 as PCB coils likewise contributes to implementing the internal power supply in a more cost-effective manner.

The described power supply already functions with very small voltages (less than 100 mW), i.e., voltages far below forward voltages of diodes. This power supply principle is thus inter alia suited to deriving a power supply for electronic circuits from small shunt voltages (e.g., on thermal or electrical measuring shunts).

It is likewise conceivable for the switching element 7 of the respective conductor 81, 82, 83 to be arranged upstream of the measuring resistor 30 of the respective conductor 81, 82, 83, i.e., each the internal conductor 81, 82, 83 is guided from its input-side connection 61, 62, 63 via the switching element 7 to the measuring resistor 30.

FIG. 2 shows a schematic design of the secondary side of the device of FIG. 1. The third capacitor 3 is connected to the three secondary-side coils of the individual phases/conductors by the diodes 6 and can be charged in this way.

An existing overcurrent can be determined on the primary side by the current detection unit 10. The current detection unit 10 has a Vin connection 25, a VDD connection 26 and a VSS connection 27. Power is supplied to the current detection unit 10 entirely by the third capacitor 3.

On the input-side, the third capacitor 3 is connected to the Vin connection 25 of the current detection unit 10 via a first resistor 16. On the output side, the third capacitor 3 is connected to the VSS connection 27 of the current detection unit 10. The VDD connection 26 is connected to the input side of the third capacitor 3 via a second resistor 17. The second resistor 17 is connected to the VSS connection 27 or the output side of the third capacitor 3 by a zener diode 20. A voltage regulation from $U_A$ to $U_{VDD}$ (zener regulation) occurs here. A third resistor 18 is connected in parallel with the Vin connection 25 and VSS connection 27.

The resistors 16 and 18 form a voltage divider, in order to adjust the primary current-dependent output voltage $U_A$ and provide the same at the measuring input (e.g., analog input of a microcontroller). This measuring signal can be compared in the current detection unit 10 with a stored overcurrent target value such that an overcurrent flowing across the conductors can be identified.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A device connectable to a three-phase supply network, the device comprising:
   a third capacitor via which of the device is internally supplied with power;
   a secondary-side coil;
   a diode;
   a conductor for each respective phase of the three-phase supply network; and
   a respective circuit for transferring power for each respective phase of the three-phase supply network, the secondary-side coil being connected in parallel with the third capacitor via the diode;
   wherein each respective circuit for transferring power comprises a measuring resistor, a first and second capacitor, a self-conducting field effect transistor and a first and second primary-side coil which are each galvanically separated from the secondary-side coil;
   wherein each respective circuit for transferring power is configured such that:
     the measuring resistor is disposed in the conductor,
     the first capacitor is connected in parallel with the measuring resistor,
     a series circuit of the first primary-side coil with the self-conducting field effect transistor is connected in parallel with the first capacitor,
     the power is transferred from the first primary-side coil to the second primary-side coil, and to the secondary-side coil in an energized state of the conductor,
     the second capacitor is connected in parallel with the second primary-side coil,
     the second capacitor is connected on an output side to a source connection of the self-conducting field effect transistor, and
     a gate connection of the self-conducting field effect transistor is connected on an input side to the second capacitor such that the self-conducting field effect transistor is controlled in a clocked manner in the energized state of the conductor.

2. The device as claimed in claim 1, wherein the circuit further comprises:
   a self-blocking field effect transistor which is connected in parallel with the self-conducting field effect transistor,
   wherein a gate connection of the self-blocking field effect transistor is connected on an input side to the second capacitor such that the self-blocking field effect transistor is controlled in a clocked manner in the energized state of the conductor.

3. The device as claimed in claim 1, wherein the device further comprises:
   a secondary-side coil and a diode for each respective conductor;
   wherein the third capacitor is connected on each input side with the diode and each output side with a coil connection of the secondary side coil which does not lead to the diode.

4. The device as claimed in claim 1, wherein the first primary side, the second primary side coil and the secondary-side coil are each formed by a printed circuit board (PCB) coil.

5. The device as claimed in claim 1, wherein the measuring resistor is a shunt.

6. The device as claimed in claim 1, wherein an overcurrent trip for a downstream load occurs by evaluating an output voltage existing across the third capacitor.

7. The device as claimed in claim 1, wherein the internal power supply of the device occurs entirely via an output voltage present on the third capacitor.

8. The device as claimed in claim 1, wherein the first primary-side coil, the second primary-side coil and the secondary-side coil have a shared coil core.

9. The device as claimed in claim 1, for comprising:
   a switching element disposed in each respective conductor via which a flow of power across the conductor is interrupted.

* * * * *